(12) United States Patent
Togashi

(10) Patent No.: US 6,768,630 B2
(45) Date of Patent: Jul. 27, 2004

(54) MULTILAYER FEEDTHROUGH CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/452,241

(22) Filed: Jun. 3, 2003

(65) Prior Publication Data

US 2003/0227738 A1 Dec. 11, 2003

(30) Foreign Application Priority Data

Jun. 11, 2002 (JP) ........................................ 2002-169521

(51) Int. Cl.$^7$ ............................................ H01G 4/228
(52) U.S. Cl. ...................... 361/306.1; 361/302; 361/303
(58) Field of Search ................................. 361/302, 303, 361/306.1, 306.3, 308.1, 309, 310, 311–313, 321.2; 333/184, 185

(56) References Cited

U.S. PATENT DOCUMENTS

| 4,590,537 | A | * | 5/1986 | Sakamoto ................. 361/306.3 |
| 6,270,613 | B1 | * | 8/2001 | Nakagawa et al. .......... 156/235 |
| 6,433,995 | B2 | * | 8/2002 | Nakagawa et al. ......... 361/311 |

FOREIGN PATENT DOCUMENTS

| JP | 59-29413 | 2/1984 |
| JP | 3-37850 | 6/1991 |
| JP | B2 6-58861 | 8/1994 |
| JP | 08-055758 | 2/1996 |
| JP | 2000-058376 | 2/2000 |
| JP | 2001-189234 | 7/2001 |

* cited by examiner

*Primary Examiner*—Anthony Dinkins
(74) *Attorney, Agent, or Firm*—Oliff & Berridge, PLC

(57) ABSTRACT

A multilayer feedthrough capacitor having a first internal conductor arranged in a dielectric body, an intermediate internal conductor arranged in the dielectric body and stacked with the first internal conductor via a ceramic layer, a second internal conductor arranged in the dielectric body and stacked with the intermediate internal conductor via a ceramic layer, a first terminal electrode formed at an outside surface of the dielectric body and connected to the first internal conductor, a second terminal electrode formed at the outside surface of the dielectric body and connected to the second internal conductor, and an intermediate terminal electrode formed at the outside surface of the dielectric body and connected to the intermediate internal conductor. The intermediate terminal electrode is connected to the ground, while the first terminal electrode and the second terminal electrode are connected to paths for transmitting signals. The first internal conductor and the second internal conductor have currents flowing through them in opposite directions.

18 Claims, 13 Drawing Sheets

MULTILAYER FEEDTHROUGH CAPACITOR

BACKGROUND OF THE INVENTION

1. Field of the Invention

The present invention relates to a multilayer feedthrough capacitor used in a noise filter etc. designed not only to deal with noise of the common mode and noise of the differential mode, but also to reduce the equivalent serial inductance (ESL) more and thereby effectively eliminate noise in the high frequency band, more particularly one suitable for an information processing device or communications device.

2. Description of the Related Art

In recent years, the majority of information processing devices and communications devices have become digitalized. Further, along with the higher speeds of processing accompanying the improvements in information processing capabilities, there has been remarkable progress in raising the frequencies of the digital signals handled by these devices. Therefore, the noise produced from these devices also tends to increase more in the high frequency band. On the other hand, efforts are being made to make these devices more portable. Along with this, further reduction in the size and weight of these devices has become desired.

To deal with the noise, most electronic equipment use electronic devices able to prevent electromagnetic wave interference or suppress unnecessary voltage fluctuations. As these electronic devices, due to such a situation, electronic devices which are small in size, light in weight, and deal with noise in the high frequency band are being sought. As such electronic devices, in general, multilayer ceramic capacitors are currently being used.

In multilayer ceramic capacitors, however, the parasitic component, that is, the ESL, obstructs the noise eliminating effect in the high frequency band, so the effect has become insufficient along with the increasingly higher frequencies of the operating frequencies of electronic equipment. That is, capacitors having large ESLs such as the conventional multilayer ceramic capacitors are increasingly becoming unable to sufficiently handle the higher frequencies of recent years.

For example, as a conventional capacitor able to reduce the ESL, a multilayer type feedthrough capacitor (multilayer feedthrough capacitor) has been developiped and is in general use. A multilayer feedthrough capacitor 110 according to the prior art will be described below based on FIG. 12 to FIG. 15.

The multilayer feedthrough capacitor 110, as shown in FIG. 13, has an internal conductor 112 having branch parts 112A and 112B led out toward two facing side surfaces. A dielectric sheet 124 formed on its surface with an internal conductor 114 led out to two side surfaces different from the two side surfaces where the branch parts 112A and 112B are led out has stacked with it a dielectric sheet 122 formed on its surface with the internal conductor 112. Dielectric sheets not formed with internal conductors are stacked above and below that stack in the stacking direction. This stack is then fired to form the stack 120 shown in FIG. 12.

As shown in FIG. 12, two facing side surfaces of the stack 120 are formed with terminal electrodes 131 and 132 which are connected to the branch parts 112A and 112B of the internal conductor 112. Further, the other two facing side surfaces of the stack 120 are formed with terminal electrodes 133 and 134 connected to the branch parts of the internal conductor 114. As shown in FIG. 14, the terminal electrodes 131 and 132 can be connected to for example the ground side, while the terminal electrodes 133 and 134 can be connected to the signal transmission paths.

A circuit diagram for dealing with noise in the common mode and differential mode using this conventional multilayer feedthrough capacitor 110 is shown in FIG. 15. As shown in FIG. 15, three multilayer feedthrough capacitors 110 are used to configure a circuit for reducing noise.

However, even in these multilayer feedthrough capacitors 110, currents flow in the directions shown by the arrows in FIG. 13, so there is an ESL of a certain magnitude. Therefore, such conventional multilayer feedthrough capacitors 110 are increasingly becoming unable to handle the higher frequencies of recent years and capacitors able to reduce the ESL further are becoming required.

Further, to deal with the higher density mounting accompanying the smaller sizes of electronic equipment, demand is rising for array type multilayer capacitors combining a plurality of capacitors.

Note that in multilayer capacitors, it is known to make the shape of the pattern of the internal conductor a substantially T-shape as shown in Japanese Unexamined Patent Publication (Kokai) No, 59-29413 and Japanese Unexamined Patent Publication (Kokai) No. 3-37850. These publications, however, do not disclose the idea of passing currents in opposite directions in internal conductors adjacent in the stacking direction so as to reduce the ESL.

Further, as shown in Japanese Unexamined Patent Publication (Kokai) No. 2000-58376, the idea has been proposed of reducing the ESL by optimizing the ratio of dimensions of the internal conductor in the capacitor. Further, as shown in Japanese Examined Patent Publication (Kokoku) No. 6-58861, Japanese Unexamined Patent Publication (Kokai) No. 8-55758, and Japanese Unexamined Patent Publication (Kokai) No. 2001-189234, the idea is known of passing currents in the opposite directions in an internal conductor of a capacitor.

However, these publications do not disclose that it is possible to reduce the noise of both the common mode and the differential mode in a multilayer feedthrough capacitor and to further reduce the ESL so as to improve the effect of elimination of high frequency noise.

SUMMARY OF THE INVENTION

An object of the present invention is to provide a multilayer feedthrough capacitor able to reduce both noise of the common mode and differential mode and able to further reduce the ESL so as to improve the effect of elimination of high frequency noise.

To achieve the above object, according to a first aspect of the present invention, there is provided a multilayer feedthrough capacitor comprising:

a first internal conductor arranged in a dielectric body, an intermediate internal conductor arranged in the dielectric body and stacked with the first internal conductor via a ceramic layer, a second internal conductor arranged in the dielectric body and stacked with the intermediate internal conductor via a ceramic layer, a first terminal electrode formed at an outside surface of the dielectric body and connected to the first internal conductor, a second terminal electrode formed at the outside surface of the dielectric body and connected to the second internal conductor, and an intermediate terminal electrode formed at the outside surface of the dielectric body and connected to the intermediate internal conductor.

Preferably, the first internal conductor and the second internal conductor have currents passing through them in opposite directions.

Preferably, inside the dielectric body, the intermediate internal conductor is stacked between the first internal conductor and second internal conductor via the ceramic layers.

Preferably, the first internal conductor is formed with a pair of branch parts led out toward two opposite outside surfaces of the dielectric body, and each of the branch parts is connected to a pair of first terminal electrodes.

Preferably, the first internal conductor has a rectangular pattern slightly narrower than the ceramic layer forming the dielectric body, and the pair of branch parts are formed at one end of the rectangular pattern in the longitudinal direction thereof.

Preferably, the second internal conductor is formed with a pair or branch parts led out toward two opposite outside surfaces of the dielectric body, and each of the branch parts is connected to each of a pair of second terminal electrodes.

Preferably, the second internal conductor has a rectangular pattern slightly narrower than the ceramic layer forming the dielectric body, and the pair of branch parts are formed at one end of the rectangular pattern in the longitudinal direction thereof.

Preferably, the intermediate internal conductor is formed with a pair of branch parts led out toward two opposite outside surfaces of the dielectric body, and each of the branch parts is connected to each of a pair of intermediate terminal electrodes.

Preferably, the intermediate internal conductor has a rectangular pattern slightly narrower than the ceramic layer forming the dielectric body, and the pair of branch parts are formed at a substantial center of the rectangular pattern in the longitudinal direction thereof.

Preferably, the intermediate internal conductor is further formed with, separate from the pair of branch parts led out toward the two opposite outside surfaces of the dielectric body, a pair of branch parts led out to another two opposite outside surfaces separate from the two outside surfaces, each of these branch parts is connected to each of a pair of the intermediate terminal electrodes, and the four the outside surfaces of the dielectric body are formed with intermediate terminal electrodes.

Preferably, the intermediate terminal electrodes are formed at the outside surfaces of the dielectric body between the first terminal electrodes and second terminal electrodes.

Preferably, the intermediate terminal electrodes are connected to the ground, while the first terminal electrodes and second terminal electrodes are connected to paths for transmission of signals.

To achieve the above object, according to a second aspect of the present invention, there is provided a multilayer feedthrough capacitor comprising:

a first internal conductor arranged in a dielectric body, an intermediate internal conductor arranged in the dielectric body and stacked with the first internal conductor via a ceramic layer, a second internal conductor arranged in the dielectric body and stacked with the intermediate internal conductor via a ceramic layer, a first terminal electrode formed at an outside surface of the dielectric body and connected to the first internal conductor, a second terminal electrode formed at the outside surface of the dielectric body and connected to the second internal conductor, an intermediate terminal electrode formed at the outside surface of the dielectric body and connected to the intermediate internal conductor, an auxiliary second internal conductor arranged insulated from the first internal conductor on the same plane inside the dielectric body and connected to the second internal conductor via the second terminal electrode, and an auxiliary first internal conductor arranged insulated from the second internal conductor on the same plane inside the dielectric body and connected to the first internal conductor via the first terminal electrode.

Preferably, the first internal conductor and the second internal conductor have currents passing through them in opposite directions, and the auxiliary first internal conductor and the auxiliary second internal conductor have currents passing through them in opposite directions.

Preferably, inside the dielectric body, the intermediate internal conductor is stacked between the first internal conductor and second internal conductor via the ceramic layers.

Preferably, the first internal conductor and auxiliary first internal conductor are respectively formed with pairs of branch parts led out toward two opposite outside surfaces of the dielectric body, and each of the branch parts is connected to each of a pair of first terminal electrodes.

Preferably, the first internal conductor and auxiliary first internal conductor respectively have rectangular patterns slightly narrower than half of the area of the ceramic layer forming the dielectric body, and the pairs of branch parts are formed at one ends of the rectangular patterns in the longitudinal direction thereof.

Preferably, the second internal conductor and auxiliary second internal conductor are respectively formed with pairs of branch parts led out toward two opposite outside surfaces of the dielectric body, and each of the branch parts is connected to a pair of second terminal electrodes, Preferably, the second internal conductor has a rectangular pattern slightly narrower than half of the area of the ceramic layer forming the dielectric body, and the pair of branch parts are formed at one end of the rectangular pattern in the longitudinal direction thereof.

Preferably, the intermediate internal conductor is formed with a pair of branch parts led out toward two opposite outside surfaces of the dielectric body, and each of the branch parts is connected to a pair of intermediate terminal electrodes.

Preferably, the intermediate internal conductor has a rectangular pattern slightly narrower than the ceramic layer forming the dielectric body, and the pair of branch parts are formed at a substantial center of the rectangular pattern in the longitudinal direction thereof.

Preferably, the intermediate internal conductor is further formed with, separate from the pair of branch parts led out toward the two opposite outside surfaces of the dielectric body, a pair of branch parts led out to another two opposite outside surfaces separate from the two outside surfaces, each of these branch parts is connected to each of the intermediate terminal electrodes, and the four the outside surfaces of the dielectric body are formed with intermediate terminal electrodes.

Preferably, the intermediate terminal electrodes are formed at the outside surfaces of the dielectric body between the first terminal electrodes and second terminal electrodes.

Preferably, the intermediate terminal electrodes are connected to the ground, while the first terminal electrodes and second terminal electrodes are connected to paths for transmission of signals.

According to the multilayer feedthrough capacitors according to the first and second aspects of the present invention, in addition to the intermediate internal conductors for grounding, there are first internal conductors and second internal conductors which signals etc. are input and output. Therefore, the capacitors of the present invention have array structures including two feedthrough capacitor elements. Therefore, it is possible to reduce both the noise of the common mode and the differential mode by just one multilayer feedthrough capacitor.

Further, in the first and second aspects of the present invention, currents flow in opposite directions in the first internal conductors and the second internal conductors. Therefore, due to the canceling action of the magnetic fields generated along with the flows of the high frequency currents in opposite directions in these internal conductors, inductance is suppressed, the ESL is further reduced, and the effect of elimination of noise in the high frequency band is improved.

In particular, in the second aspect of the present invention, an auxiliary second internal conductor is also arranged in the plane in which the first internal conductor is arranged and currents flow in opposite directions in these internal conductors. That is, currents flow in opposite directions in the two internal conductors arranged adjoining each other in the same plane. Therefore, the ESL is further reduced, and the effect of elimination of noise in the high frequency band is improved.

Further, in the aspect of the invention where one intermediate terminal electrode is arranged at each outside surface of the dielectric body, for a total of four, the terminal electrodes are arranged optimally at the outside surfaces of the capacitor body. Therefore, it becomes possible to effectively utilize the side surfaces of the capacitor body forming the multilayer feedthrough capacitor. Further, at least four intermediate terminal electrodes are connected to the interconnects of the external ground patterns. Along with this, the inductance at the branch parts of the intermediate internal conductors becomes smaller. As a result, the ESL is further reduced.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

First Embodiment

Figure 1:
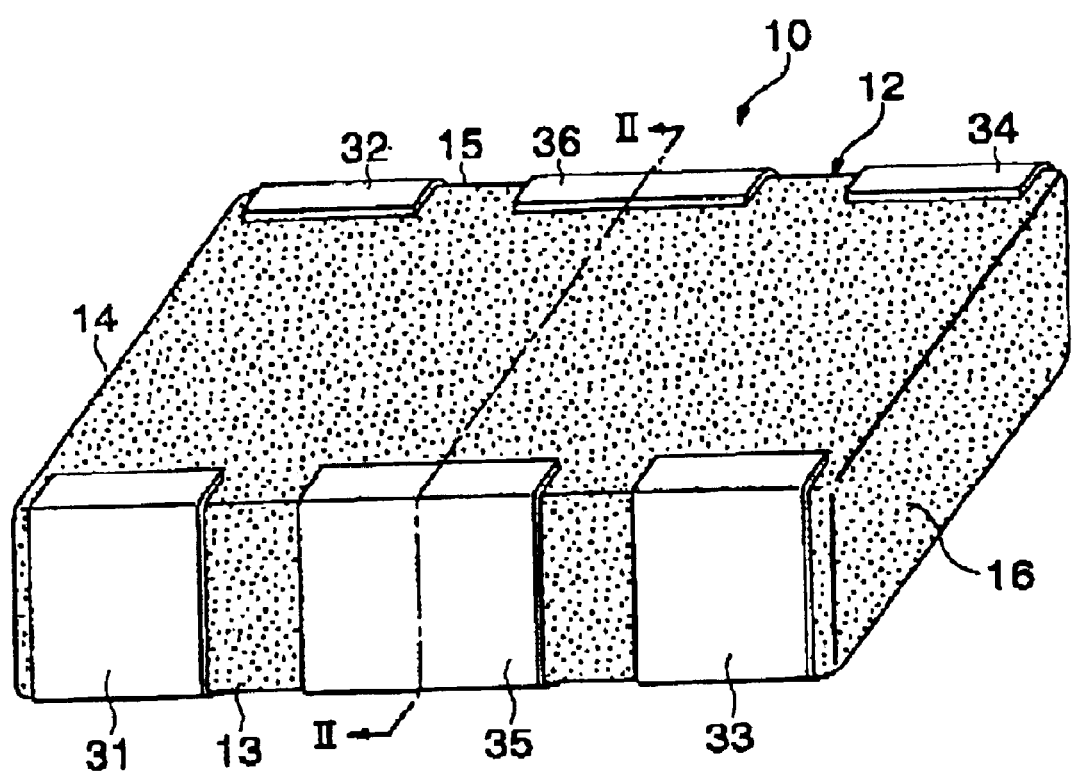
FIG. 1 is a perspective view of a multilayer feedthrough capacitor according to a first embodiment of the present invention.

As shown in FIG. 1, a multilayer feedthrough capacitor 10 according to a first embodiment of the present invention has as its main part a dielectric body 12 formed as a sintered body of a parallelepiped shape obtained by firing a stack of a plurality of dielectric sheets, that is, ceramic green sheets, stacked together. The parallelepiped shaped dielectric body 12, as shown in FIG. 1, has six outside surfaces, two surfaces of which form the top and bottom surfaces and the remaining surfaces of which form the long side outside surfaces 13 and 15 and the short side outside surfaces 14 and 16.

Figure 2:
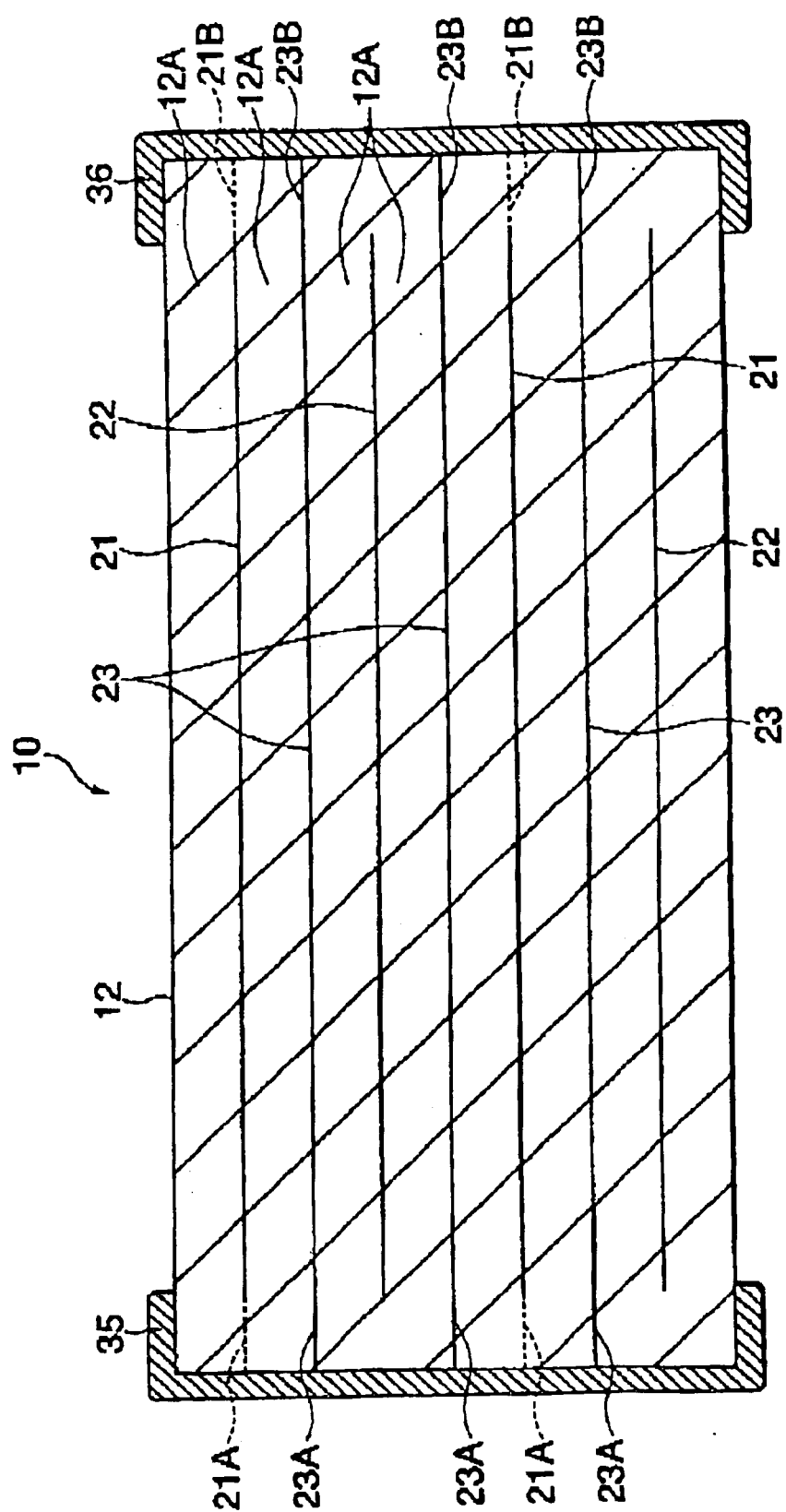
FIG. 2 is a sectional view of a multilayer feedthrough capacitor according to the first embodiment taken along the line II—II shown in FIG. 1.
Figure 3:
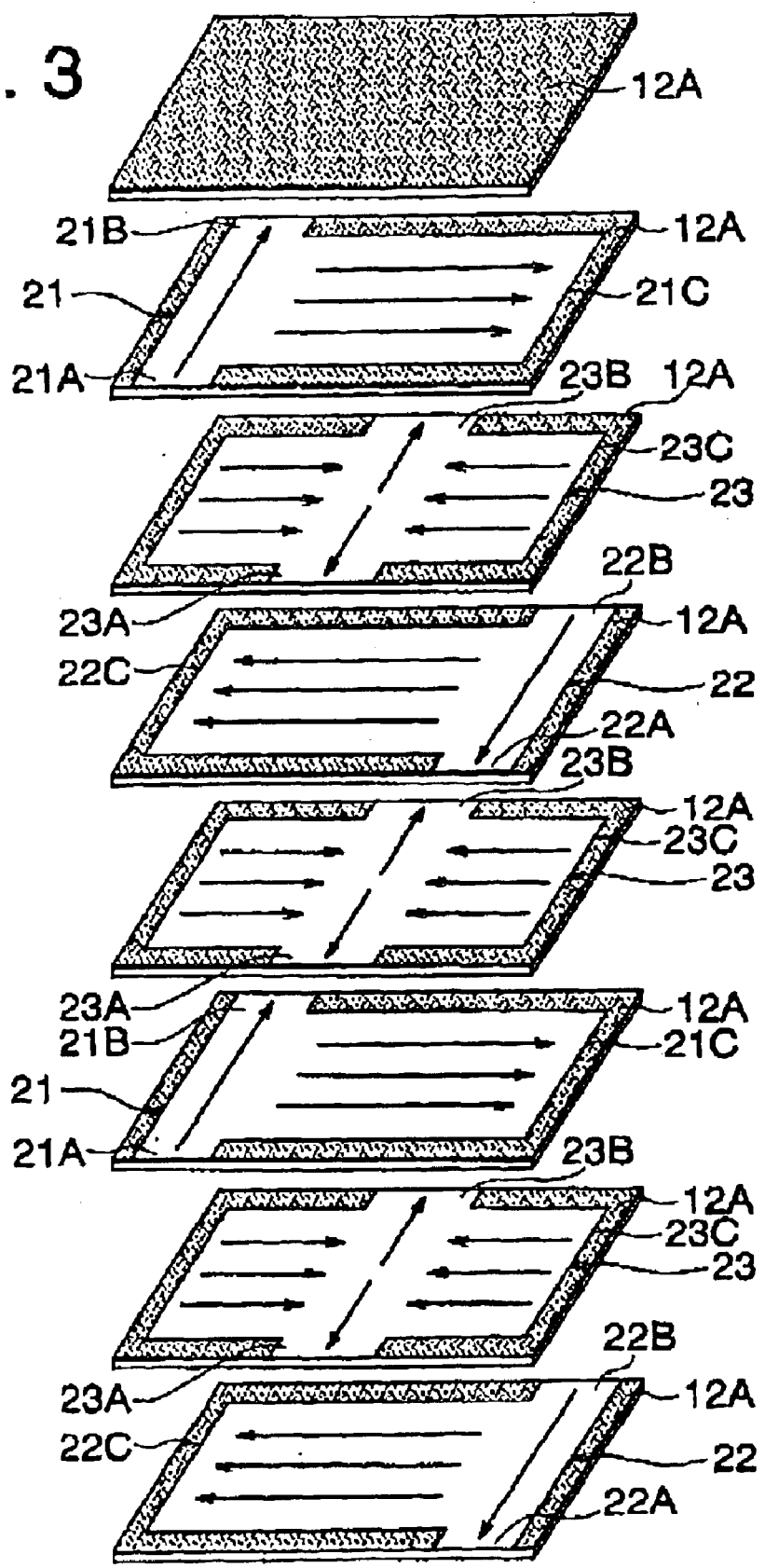
FIG. 3 is a broken down perspective view of a multilayer feedthrough capacitor according to the first embodiment.

As shown in FIG. 2 and FIG. 3, a first internal conductor 21 is arranged below the topmost layer ceramic layer (dielectric sheet) 12A in this dielectric body 12. This dielectric body 12 further has an intermediate internal conductor 23 arranged below this first internal conductor 21. A ceramic layer 12A is disposed between the conductors 21 and 23.

This dielectric body 12 additionally has a second internal conductor 22 arranged below the intermediate internal conductor 23. The other ceramic layer 12A is disposed between the conductors 22 and 23. The dielectric body 12 then has the other intermediate internal conductor 23 arranged below this second internal conductor 22. The other ceramic layer 12A is disposed between the conductors 23 and 22.

Further, the dielectric body 12 has first internal conductors 21, intermediate internal conductors 23, and second internal conductors 22 successively arranged in that order below this intermediate internal conductor 23 via ceramic layers 12A in the same way as above.

As a result, the dielectric body 12 has intermediate internal conductors 23 arranged between first internal conductors 21 and second internal conductors 22. Three types of internal conductors 21 to 23 are therefore stacked facing each other via ceramic layers 12A.

That is, at least one ceramic layer 12A is stacked sandwiched between each first internal conductor 21 and intermediate internal conductor 23, between each intermediate internal conductor 23 and second internal conductor 22, and between each second internal conductor 22 and intermediate internal conductor 23. By sintering, a dielectric body 12 is formed.

Each first internal conductor 21 and second internal conductor 22 are made electrodes forming paths for transmitting signals. Capacitors are formed between the first internal conductors 21 and second internal conductors 22. Further, the intermediate internal conductors 23 arranged between the internal conductors 21 and the internal conductors 22 become ground use electrodes.

Note that these three types of internal conductors 21 to 23 need not be in the numbers shown in FIG. 2 and FIG. 3. Further greater numbers may also be arranged. Further, as the materials of these internal conductors 21 to 23, for example, nickel, nickel alloy, copper, or copper alloy may be considered, but the invention is not limited to these.

As shown in FIG. 1 to FIG. 3, a first internal conductor 21 has a main part (rectangular pattern) 21C of an area slightly smaller than the ceramic layers 12A forming the dielectric body 12. One end of the main part 21C in the longitudinal direction (in FIG. 3, the left end) in this first internal conductor 21 is formed with a pair of branch parts 21A and 21B. The pair of branch parts 21A and 21B extend toward the two opposite outside surfaces 13 and 15 in the dielectric body 12 shown in FIG. 1 and are exposed at the outside of the body 12. At portions other than these branch parts 21A and 21B, the first internal conductor 21 has the rectangular pattern separated from the outside surfaces of the dielectric body 12 by exactly a predetermined distance as shown in FIG. 3.

As shown in FIG. 1 to FIG. 3, a second internal conductor 22 has a main part (rectangular pattern) 22C of an area slightly smaller than the ceramic layers 12A forming the dielectric body 12. One end of the main part 22C in the longitudinal direction (in FIG. 3, the right end) in this second internal conductor 22 is formed with a pair of branch parts 22A and 22B. The pair of branch parts 22A and 22B extend toward the two opposite outside surfaces 13 and 15 in the dielectric body 12 shown in FIG. 1 and are exposed at the outside of the body 12. At portions other than these branch parts 22A and 22B, the second internal conductor 22 has the rectangular pattern separated from the outside surfaces of the dielectric body 12 by exactly a predetermined distance as shown in FIG. 3.

Seen from the top of the stacking direction of the ceramic layers 12A (seen from the plan view), the main part 22C of the second internal conductor 22 overlaps with the main part 21C of a first internal conductor 21. However, the pair of branch parts 21A and 21B formed at the first internal conductor 21 are formed at the opposite side in the longitudinal direction of the rectangular pattern from the pair of branch parts 22A and 22B formed at the second internal conductor 22.

As shown in FIG. 1 to FIG. 3, an intermediate internal conductor 23 has a main part (rectangular pattern) 23C of an area slightly smaller than the ceramic layers 12A forming the dielectric body 12. The center part of the main part 23C of the intermediate internal conductor 23 in the longitudinal direction is formed with a pair of branch parts 23A and 23B. This pair of branch parts 23A and 23B extend toward the two opposite outside surfaces 13 and 15 of the dielectric body 12 shown in FIG. 1 and are exposed at the outside of the body 12. At portions other than the branch parts 23A and 23B, the intermediate internal conductor 23 has the rectangular pattern separated from the outside surface of the dielectric body 12 by exactly a predetermined distance as shown in FIG. 3.

Seen from the top of the stacking direction of the ceramic layers 12A (see from the plan view), the main part 23C of the intermediate internal conductor 23 overlaps the main part 21C of a first internal conductor 21. However, the branch parts 23A and 23B of the intermediate internal conductor 23 do not overlap the pair of branch parts 21A and 21B formed at the first internal conductor 21 and do not overlap the pair of branch parts 22A and 22B formed at the second internal conductor 22.

As shown in FIG. 1 to FIG. 3, the branch parts 21A and 21B of a first internal conductor 21 have connected to them first input/output terminal electrodes (first terminal electrodes) 31 and 32 formed at one end of the two opposite outside surfaces 13 and 15 in the longitudinal direction of the dielectric body 12.

Further, the branch parts 22A and 22B of a second internal conductor 22 have connected to them second input/output terminal electrodes 33 and 34 formed at the other ends in the longitudinal direction of the two opposite outside surfaces 13 and 15 of the dielectric body 12.

Further, the branch parts 23A and 23B of an intermediate internal conductor 23 have connected to them the ground use terminal electrodes (intermediate terminal electrodes) 35 and 36 formed at the centers in the longitudinal direction of the two opposite outside surfaces 13 and 15 of the dielectric body 12. That is, the ground use terminal electrodes 35 and 36 are formed between the first input/output terminal electrodes 31 and 32 and the second input/output terminal electrodes 33 and 34.

These terminal electrodes 31 to 36 are formed so as to be insulated from each other at the two opposite outside surfaces 13 and 15 of the dielectric body 12. These terminal electrodes 31 to 36 are formed to extend from the top surface to bottom surface of the body at the side surfaces 13 and 15 of the body 12. In the present embodiment, the short side outside surfaces 14 and 16 of the dielectric body 12 are not formed with terminal electrodes.

As a result of the above, in the multilayer feedthrough capacitor 10 of the present embodiment, as shown in FIG. 1, the two facing surfaces 13 and 15 of the four outside surfaces 13, 14, 15, 16 of the dielectric body 12 formed in a parallelepiped shape, that is, a six-sided shape, have three pairs of terminal electrodes 31 to 36 arranged at them, that is, a six-terminal structure is formed.

Further, in the present embodiment, first internal conductors 21 and second internal conductors 22 are arranged sandwiching intermediate internal conductors 23 along the stacking direction of the ceramic layers 12A. Further, the branch parts 21A, 21B of the first internal conductors 21 and the branch parts 22A, 22B of the second internal conductors 22 are arranged near different ends of ceramic layers 12A in the longitudinal direction. Therefore, currents flow in opposite directions in the main parts 21C of the first internal conductors 21 and the main parts 22C of the second internal conductors 22 as shown by the arrows of FIG. 3.

Next, the action of the multilayer feedthrough capacitor 10 according to the present embodiment will be explained.

According to the multilayer feedthrough capacitor 10 according to the present embodiment, ceramic layers 12A are stacked in a plurality of layers in a state with at least one ceramic layer 12A sandwiched between two of the three types of internal conductors of the internal conductors 21 to 23.

Between the main part 21C of a first internal conductor 21 and the main part 22C of a second internal conductor 22, the branch parts 21A, 21B, 22A, 22B are formed so that currents flow in opposite directions as shown by the arrows of FIG. 3.

Further, the pair of first input/output terminal electrodes 31, 32 and the pair of second input/output terminal electrodes 33, 34 are arranged at the two facing long side outside surfaces 13, 15 of the dielectric body 12. Further, at the portions between the first input/output terminal electrodes 31, 32 and the second input/output terminal electrodes 33, 34 at these two outside surfaces 13, 15 of the dielectric body 12, a pair of ground use terminal electrodes 35, 36 are arranged.

Therefore, according to the multilayer feedthrough capacitor 10 according to the present embodiment, in addition to the ground use intermediate internal conductors 23, there are the first internal conductors 21 and second internal conductors 22 with respect to which signals are input and output. Therefore, the capacitor 10 forms an array structure including two multilayer feedthrough capacitor elements. As a result, with a single multilayer feedthrough capacitor 10, it is possible to reduce the noise in the common mode and reduce the noise in the differential mode.

Further, in the present embodiment, as explained above, these internal conductors 21, 22 are formed so that currents flow in opposite directions in the main parts 21C of the first internal conductors 21 and the main parts 22C of the second internal conductors 22. Therefore, for example, as shown in FIG. 4, when connecting the capacitor 10 to the interconnects 43 and 44, the following action and effect are exhibited.

Figure 4:
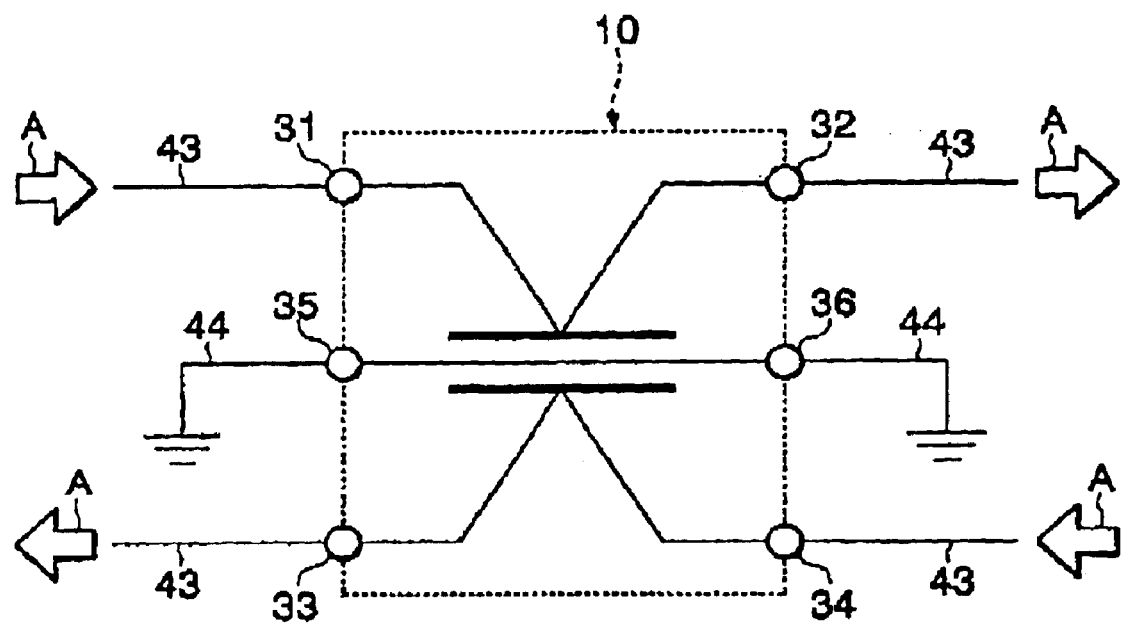
FIG. 4 is a circuit diagram of the state of mounting of a multilayer feedthrough capacitor according to the first embodiment.

That is, the first input/output terminal electrodes 31, 32 and the second input/output terminal electrodes 33, 34 have interconnects 43 for transmitting signals connected to them and have interconnects 44 connected to them so that the ground use terminal electrodes 35, 36 are grounded. When currents flow through the interconnects 43 in the directions shown by the arrows A in FIG. 4, the result becomes as follows:

That is, if currents flow in the directions shown by the arrows A in FIG. 4, the currents will flow in opposite directions in the main parts 21C of the first internal conductors 21 and the main parts 22C of the second internal conductors 22 as shown by the arrows of FIG. 3.

Further, in the case of flows of high frequency currents as well, currents flow in opposite directions in the internal conductors 21 and 22 at all times. Due to the action of canceling the magnetic fields arising along with this, the inductance is suppressed, the ESL is reduced further, and the effect of elimination of noise in the high frequency band is improved.

Second Embodiment

Next, a multilayer feedthrough capacitor according to a second embodiment of the present invention will be explained with reference to FIG. 5. Further, parts common with the parts explained in the first embodiment are assigned the same reference numerals and overlapping explanations are omitted.

Figure 5:
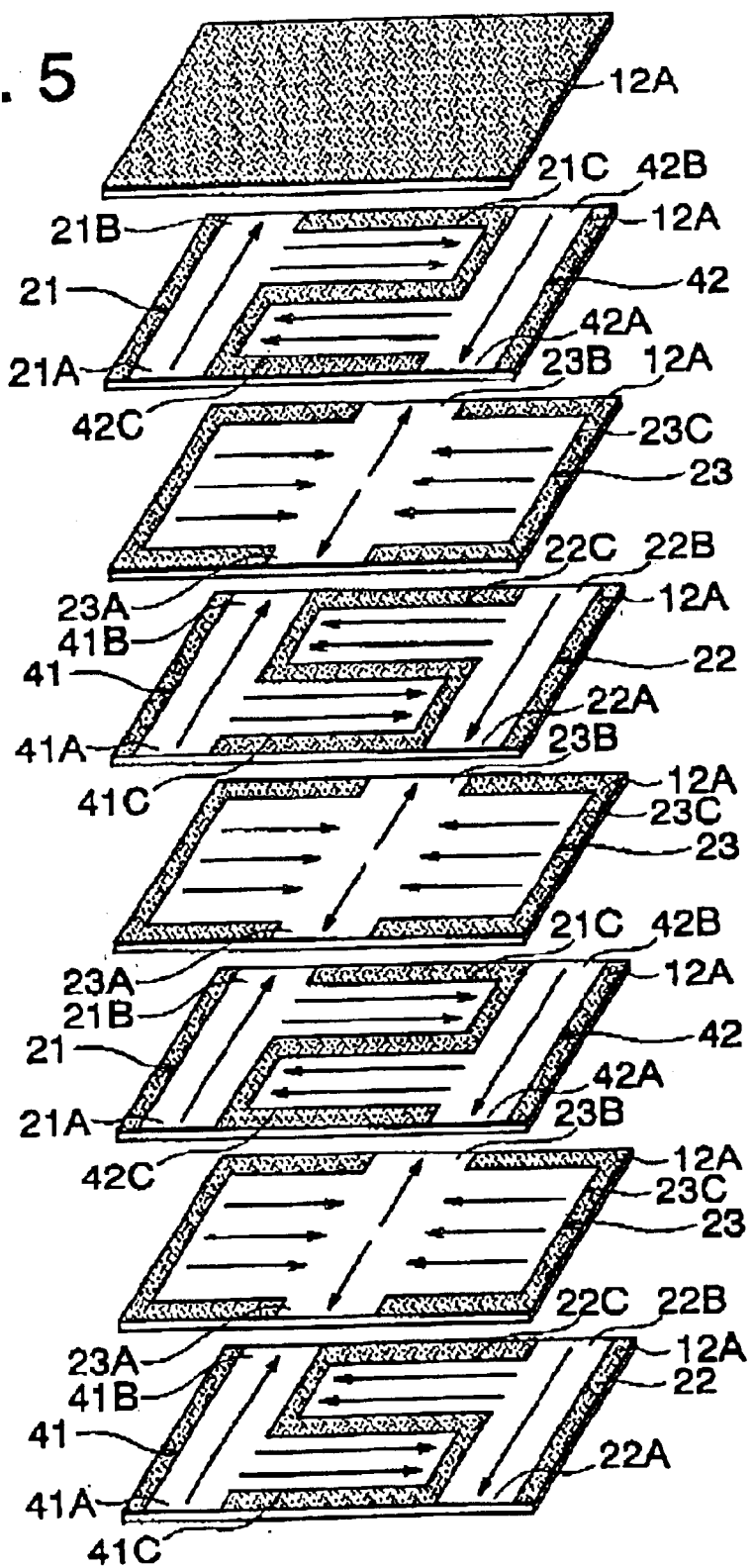
FIG. 5 is a broken down perspective view of a multilayer feedthrough capacitor according to a second embodiment of the present invention.

As shown in FIG. 5, in the present embodiment, the main parts 21C of the first internal conductors 21 are formed shorter compared with the first embodiment and narrower at the portions near the back of the ceramic layers 12A. Further, at the open parts on the ceramic layers 12A, that is, the portions near the front of the ceramic layers 12A, the main parts (rectangular patterns) 42C of the auxiliary second internal conductors 42 are formed. That is, the auxiliary second internal conductors 42 are arranged insulated from the first internal conductors 21 in the same plane where the first internal conductors 21 are arranged.

Similarly, the main parts 22C of second internal conductors 22 are formed shorter compared with the first embodiment and narrower at the portions near the back of the ceramic layers 12A. Further, at the open parts on the ceramic layers 12A, that is, the portions near the front of the ceramic layers 12A, the main parts (rectangular patterns) 41C of the auxiliary first internal conductors 41 are formed. That is, the auxiliary first internal conductors 41 are arranged insulated from the second internal conductors 22 in the same plane where the second internal conductors 22 are arranged.

An auxiliary first internal conductor 41 is formed with a pair of branch parts 41A and 41B extending toward the long side outside surfaces 13 and 15 and exposed at the outside surface of the body 12. The patterns of the branch parts 41A and 41B overlap with the patterns of the branch parts 21A and 21B when seen from the top of the stacking direction of the ceramic layers 12A. Therefore, the branch parts 41A and 41B are connected with the first input/output terminal electrodes 31 and 32 in the same way as the branch parts 21A and 21B.

An auxiliary second internal conductor 42 is formed with a pair of branch parts 42A and 42B extending toward the long side outside surfaces 13 and 15 and exposed at the outside surface of the body 12. The patterns of the branch parts 42A and 42B overlap with the patterns of the branch parts 22A and 22B when seen from the top of the stacking direction of the ceramic layers 12A. Therefore, the branch parts 42A and 42B are connected with the second input/output terminal electrodes 33 and 34 in the same way as the branch parts 22A and 22B.

The pattern of the main part 21C of a first internal conductor 21 and the pattern of the main part 22C of a second internal conductor 22 overlap when seen from the top of the stacking direction of the ceramic layers 12A and form a capacitor circuit. Further, the pattern of the main part 41C of an auxiliary first internal conductor 41 and the pattern of the main part 42C of an auxiliary second internal conductor 42 overlap when seen from the top of the stacking direction of the ceramic layers 12A and form a capacitor circuit.

In the present embodiment, a first internal conductor 21 and auxiliary second internal conductor 42 arranged in the same plane have main parts 21C and 42C of rectangular patterns of areas smaller than half of the area of the ceramic layers 12A. Further, a second internal conductor 22 and auxiliary first internal conductor 41 arranged in the same plane have main parts 22C and 41C of rectangular patterns of areas smaller than half of the area of the ceramic layers 12A.

In the present embodiment, the main part 21C of a first internal conductor 21 and the main part 22C of a second internal conductor 22 have currents flowing in opposite directions, while the main part 41C of an auxiliary first internal conductor 41 and the main part 42C of an auxiliary second internal conductor 42 have currents flowing in opposite directions.

With the present embodiment as well, in the same way as in the first embodiment, high frequency currents flow in opposite directions through the first internal conductors 21 and second internal conductors 22 arranged along the stacking direction and high frequency currents flow in opposite directions through the auxiliary second internal conductors 42 and auxiliary first internal conductors 41. Therefore, due to the action of canceling the magnetic fields caused along with this, the effect of elimination of noise in the high frequency band is improved.

Further, according to the present embodiment, currents flow in opposite directions in each first internal conductor 21 and auxiliary second internal conductor 42 arranged adjacent in the same plane. Further, the same is true in each second internal conductor 22 and auxiliary first internal conductor 41. Therefore, an action canceling out the magnetic field arises due to the currents flowing through these and the parasitic inductances of the internal conductors themselves can be reduced between the pairs of internal conductors 21, 42 (22, 41) arranged in the same plane.

As a result, in the present embodiment, not only is the ESL reduced by an action similar to the first embodiment, but also the ESL is further reduced and the effect of elimination of noise in the high frequency band is further increased.

Third Embodiment

Next, a multilayer feedthrough capacitor according to a third embodiment of the present invention will be explained with reference to FIG. 6 and FIG. 7. Note that parts common with the parts explained in the first embodiment are assigned the same reference numerals and overlapping explanations are omitted.

Figure 6:
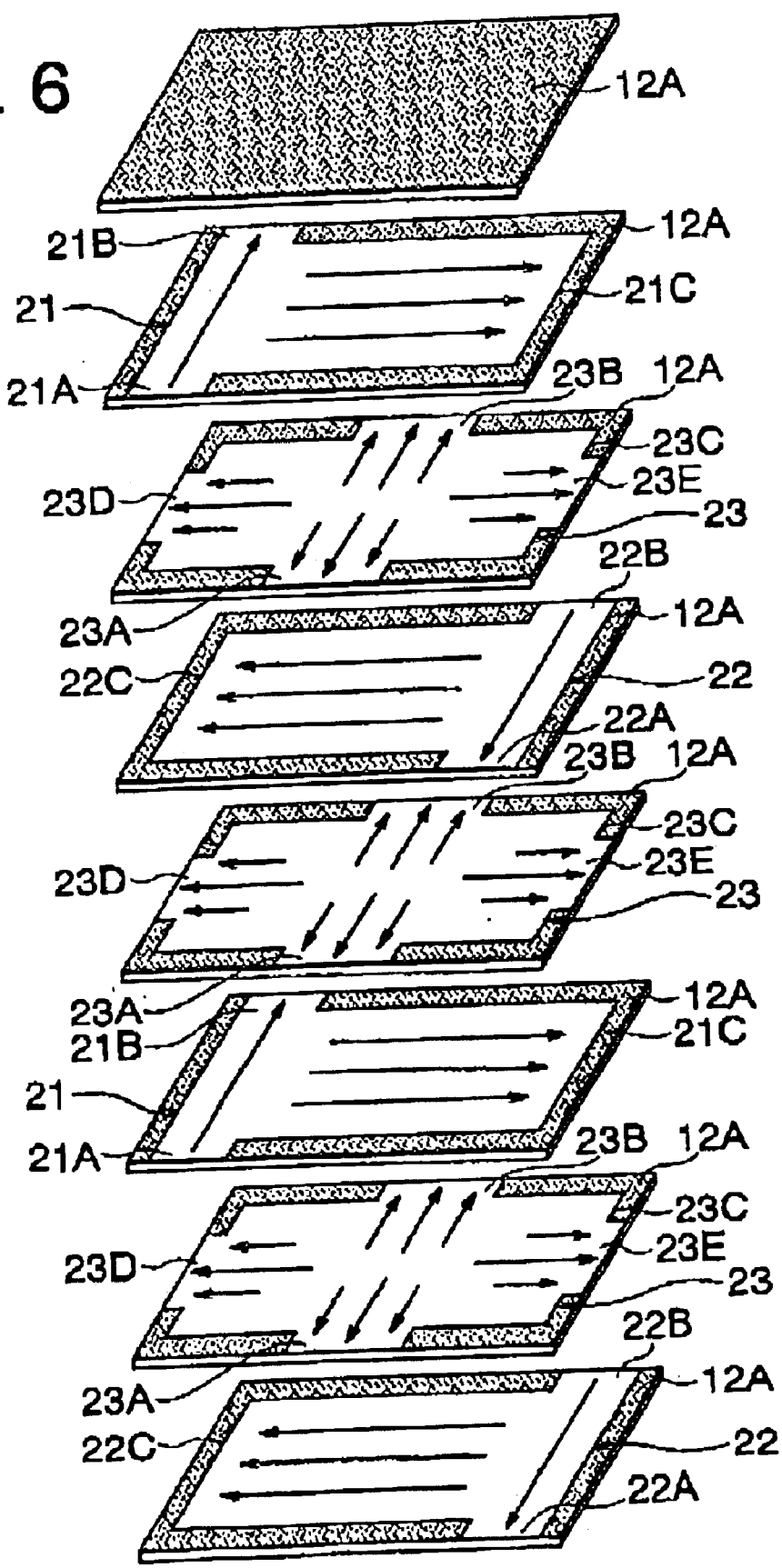
FIG. 6 is a broken down perspective view of a multilayer feedthrough capacitor according to a third embodiment of the present invention.

As shown in FIG. 6, in this embodiment, the shapes of the first internal conductors 21 and the second internal conductors 22 are the same as in the first embodiment. The intermediate internal conductors 23, however, not only have the pair of branch parts 23A, 23B similar to the first embodiment, but also have the branch parts 23D, 23E led out in substantially perpendicular directions to the branch parts 23A, 23B. The branch parts 23D, 23E are led out toward the centers of the short side outside surfaces 14, 16 of the body 12 shown in FIG. 7 and are connected to the ground use terminal electrodes (intermediate terminal electrodes) 37, 38 formed at the centers of those outside surfaces 14, 16.

Figure 7:
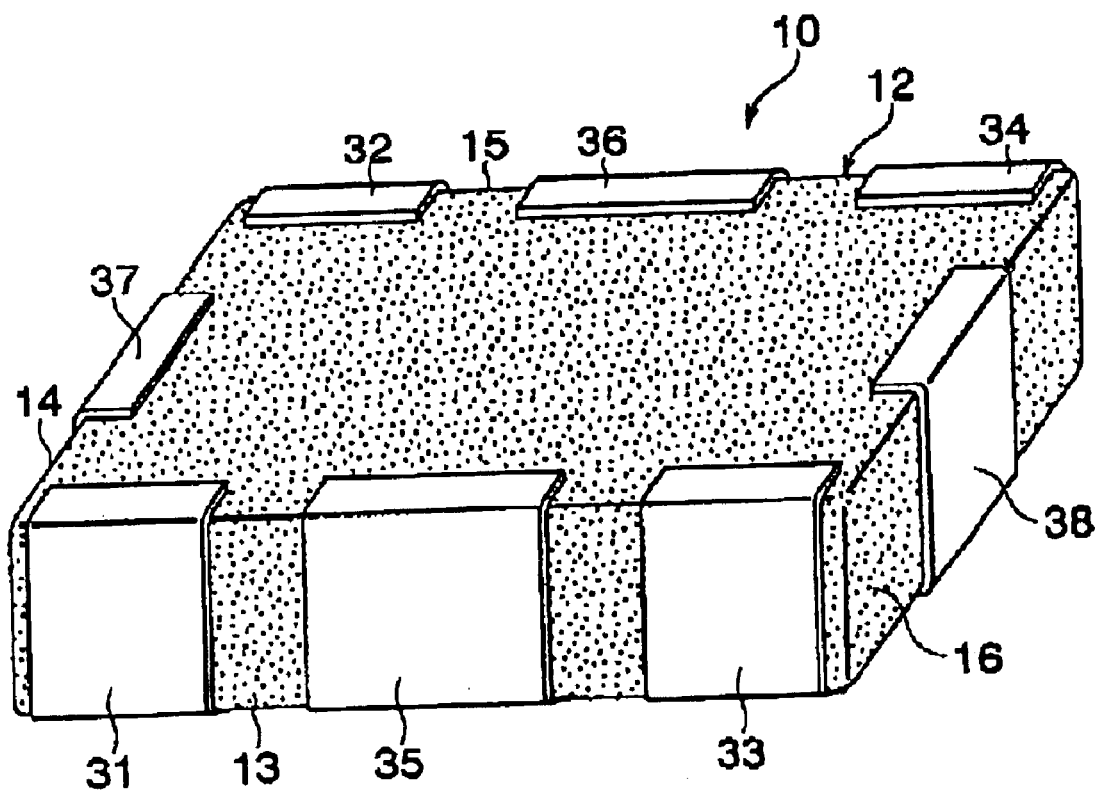
FIG. 7 is a broken down perspective view of a multilayer feedthrough capacitor according to the third embodiment.

The branch parts 23A, 23B, 23D, 23E shown in FIG. 6, as shown in FIG. 7, are connected to the ground use terminal electrodes 35, 36, 37, 38 present at the substantial centers of the four outside surfaces 13 to 16.

Therefore, according to the present embodiment, not only does a similar action as with the first embodiment occur, but also, since the side surfaces 13 to 16 of the dielectric body 12 have the terminal electrodes optimally arranged at them, it becomes possible to effectively utilize the side surfaces of the dielectric body 12 forming the multilayer feedthrough capacitor 10.

According to the present embodiment, four ground use terminal electrodes 35, 36, 37, and 38 are connected to the ground use interconnects 44 shown in FIG. 4. Therefore, the inductance at the branch parts of the intermediate internal conductor 23 becomes smaller and therefore the ESL is further reduced.

Experimental Example

Next, the results of measurement of the attenuation characteristics and ESL of the following samples by a network analyzer will be shown.

Figure 12:
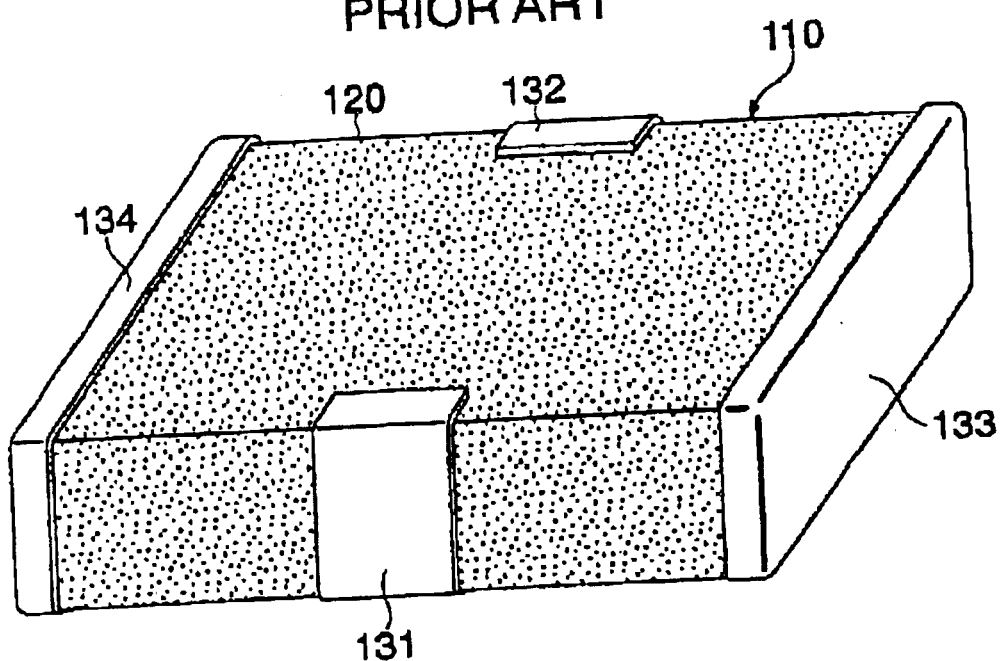
FIG. 12 is a perspective view of a multilayer feedthrough capacitor of the prior art.
Figure 13:
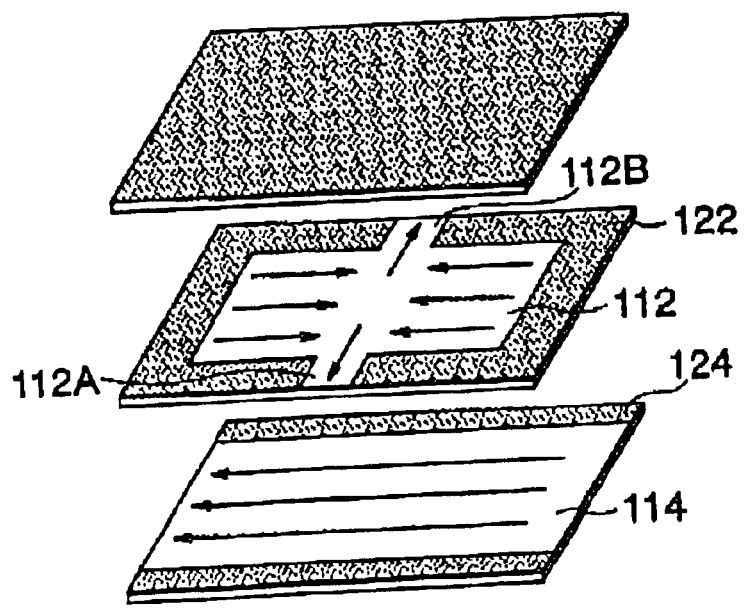
FIG. 13 is a broken down perspective view of the multilayer structure of a multilayer feedthrough capacitor of the prior art.
Figure 14:
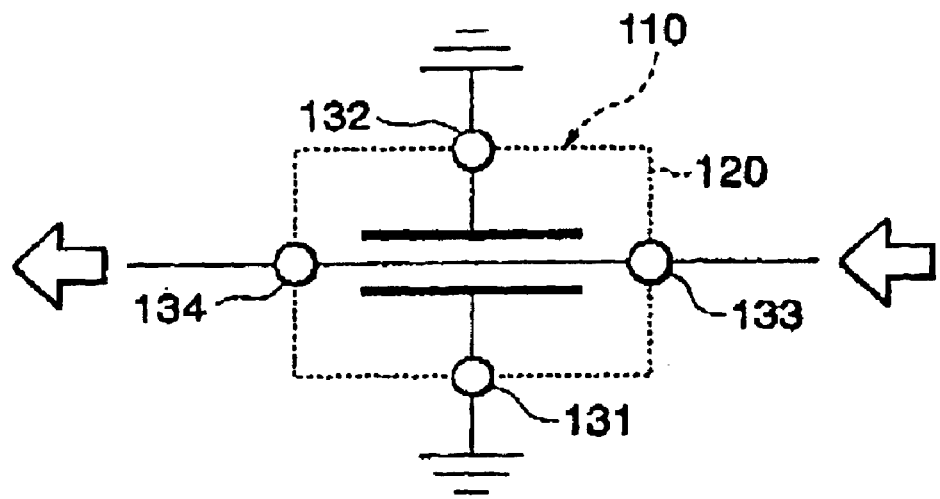
FIG. 14 is an equivalent circuit diagram of a multilayer feedthrough capacitor of the prior art.
Figure 15:
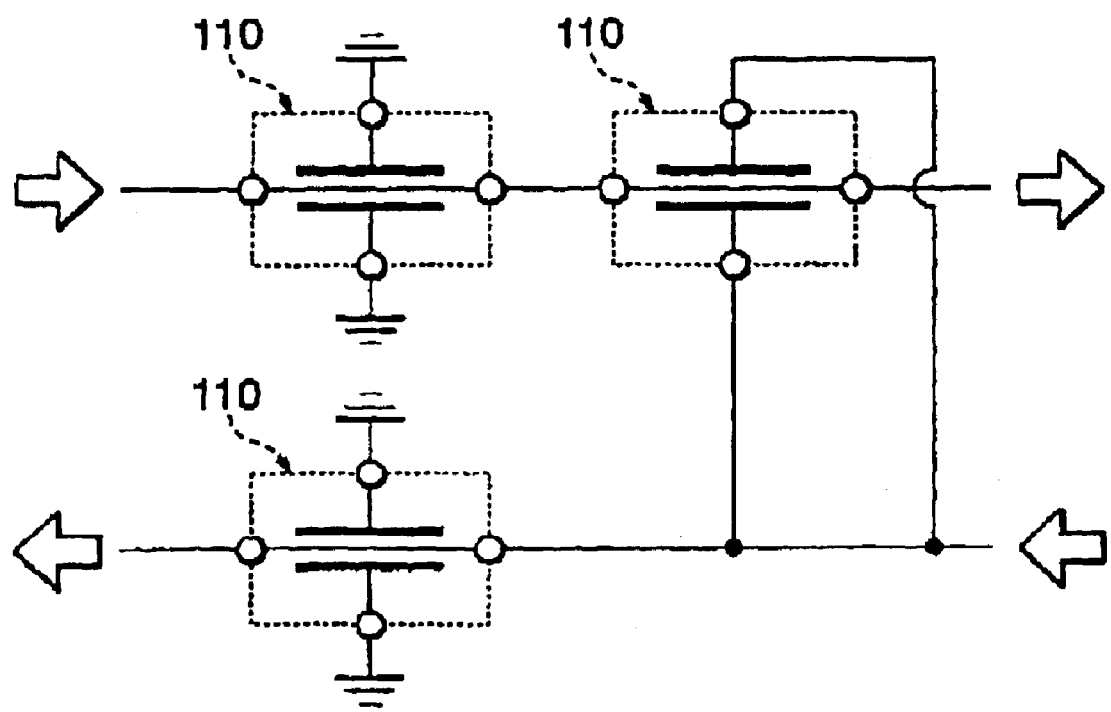
FIG. 15 is a circuit diagram of an example of use employing a multilayer feedthrough capacitor of the prior art.

The multilayer feedthrough capacitor 10 of the first embodiment shown in FIG. 1 to FIG. 3 and multilayer feedthrough capacitors 110 of the prior art shown in FIG. 12 to FIG. 13 were prepared as experimental samples. These samples were measured for attenuation characteristics and ESL etc.

Figure 9A:
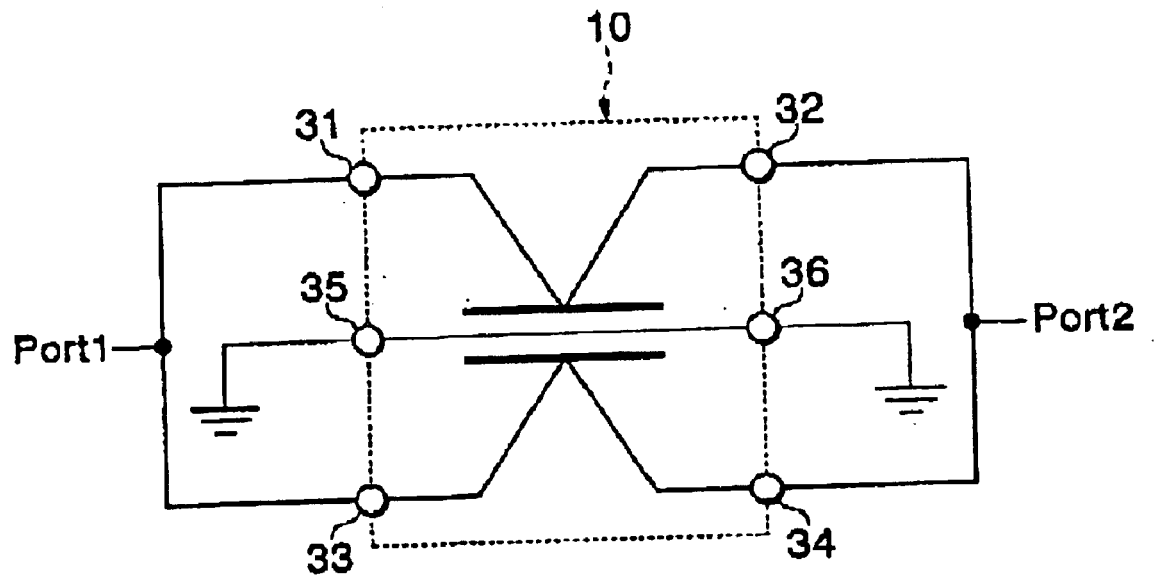
FIG. 9A is a circuit diagram of the state of a multilayer feedthrough capacitor according to an embodiment of the present invention connected to a network analyzer.
Figure 9B:
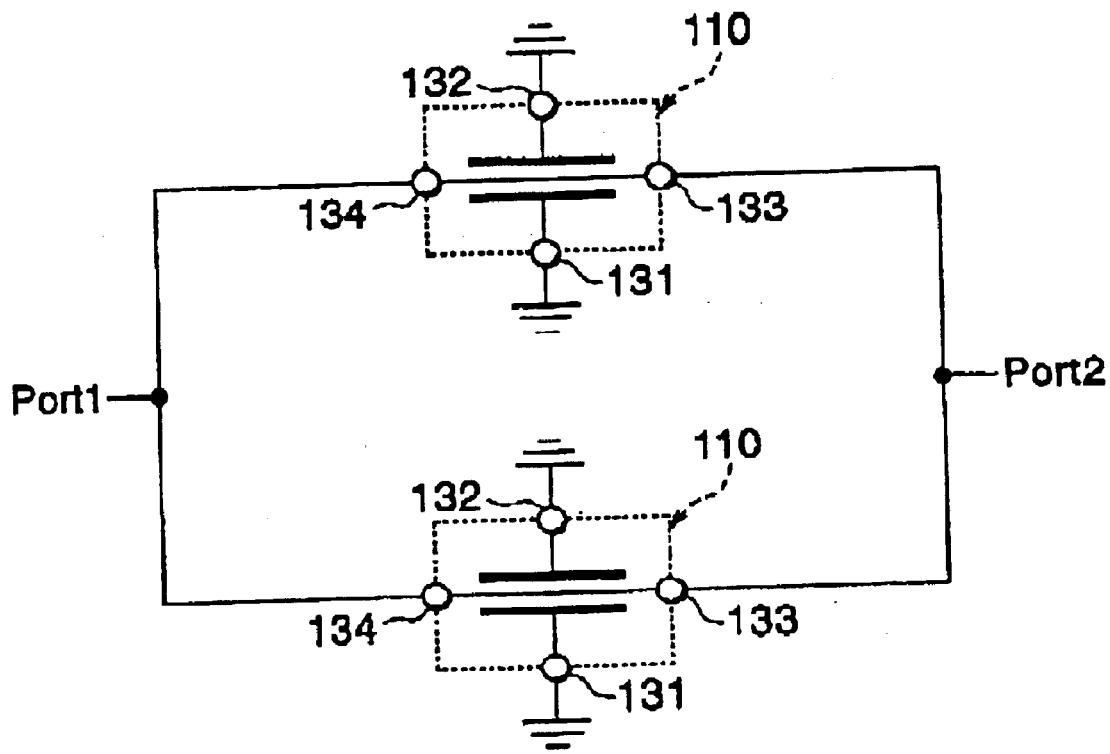
FIG. 9B is a circuit diagram of the state of a multilayer feedthrough capacitor according to the prior art connected to a network analyzer.

At the time of the experiment, as shown by the circuit diagram of FIG. 9A, the multilayer feedthrough capacitor 10 of the first embodiment was connected to the input/output ends of the not shown network analyzer, that is, Port 1 and Port 2, for measurement. Further, as shown in the circuit diagram of FIG. 9B, two multilayer feedthrough capacitors 110 of the prior art were connected in the same way to the Port 1 and Port 2 of the network analyzer for measurement.

Figure 8:
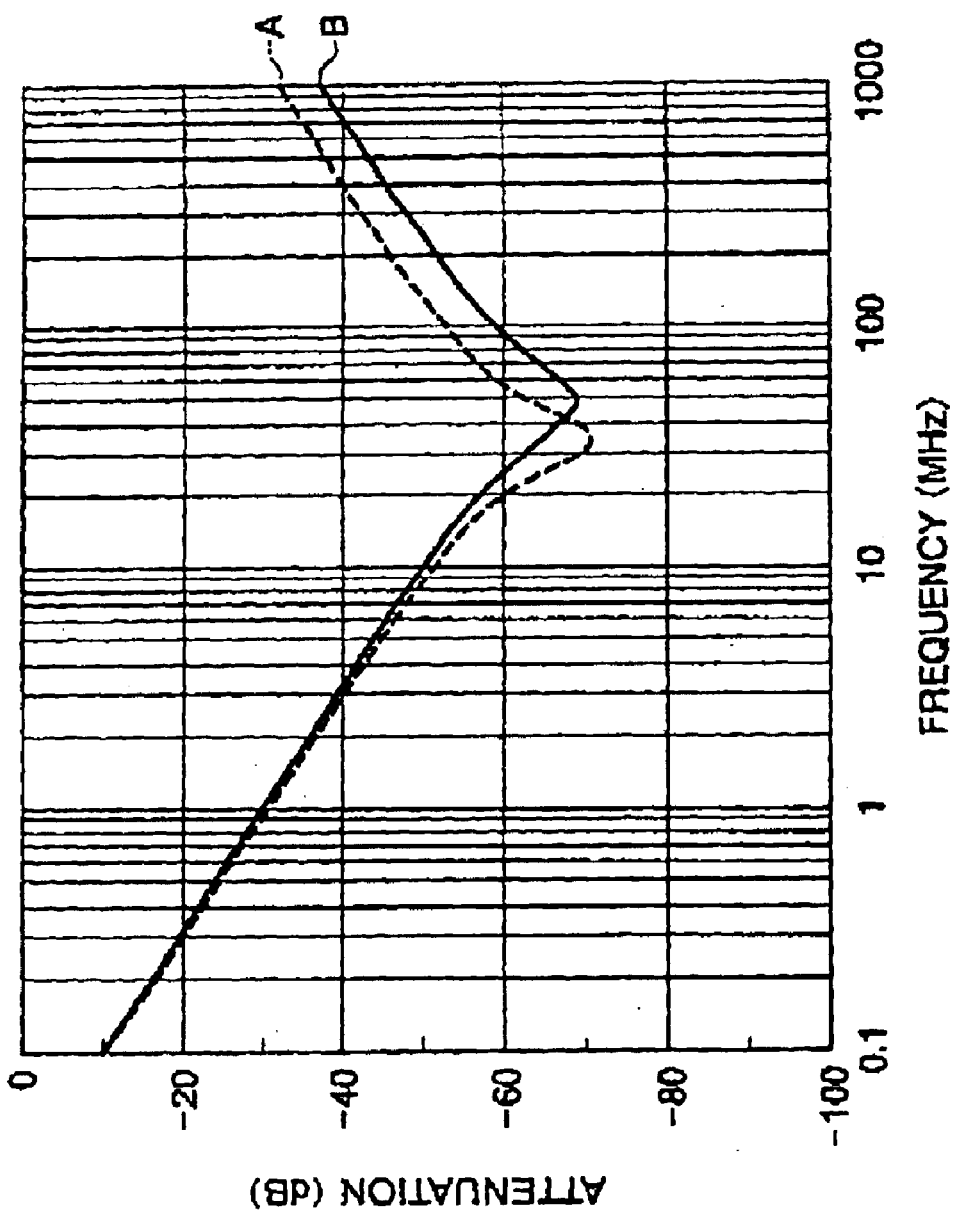
FIG. 8 is a graph of the attenuation characteristics of a multilayer feedthrough capacitor.

As a result of the measurement, as shown by the graph of the attenuation characteristics shown in FIG. 8, with the use of two multilayer feedthrough capacitors 110 of the prior art, as shown by the broken line characteristic curve A, the peak of attenuation occurred at a frequency of about 32 MHz. As opposed to this, with the multilayer feedthrough capacitor 10 of the first embodiment, as shown by the solid line characteristic curve B, the peak of attenuation occurred at a frequency of about 50 MHz.

That is, it was confirmed that with the multilayer feedthrough capacitor 10 according to the embodiment of the present invention, compared with the multilayer feedthrough capacitor 110 of the prior art, there was greater attenuation at the higher frequency side and the effect of elimination of noise at the high frequency band was improved.

Further, with the use of two multilayer feedthrough capacitors 110 of the prior art, the ESL was 98 pH, while with multilayer feedthrough capacitor 10 of the first embodiment, the ESL was 56 pH. That is, it was confirmed that with the multilayer feedthrough capacitor 10 according to the embodiment of the present invention, compared with the multilayer feedthrough capacitor 110 of the prior art, the ESL was greatly reduced.

Further, the ESL is found from the formula $2\pi f_o = 1/\sqrt{ESL \cdot C}$, where $f_o$ is the self resonance frequency and C is the electrostatic capacity. Further, as the dimensions of the samples used here, the length was 2.0 mm and the width was 1.2 mm. Further, the electrostatic capacities of the multilayer feedthrough capacitors 110 of the prior art were 0.1 $\mu$F or so, while the electrostatic capacity measured when connecting two of these multilayer feedthrough capacitors 110 of the prior art in series was 0.21 $\mu$F. The electrostatic capacity of the multilayer feedthrough capacitor 10 of the first embodiment was 0.19 $\mu$F.

Method of Use of Capacitor

Next, examples of connection of the multilayer feedthrough capacitor of the first embodiment will be explained.

Figure 10:
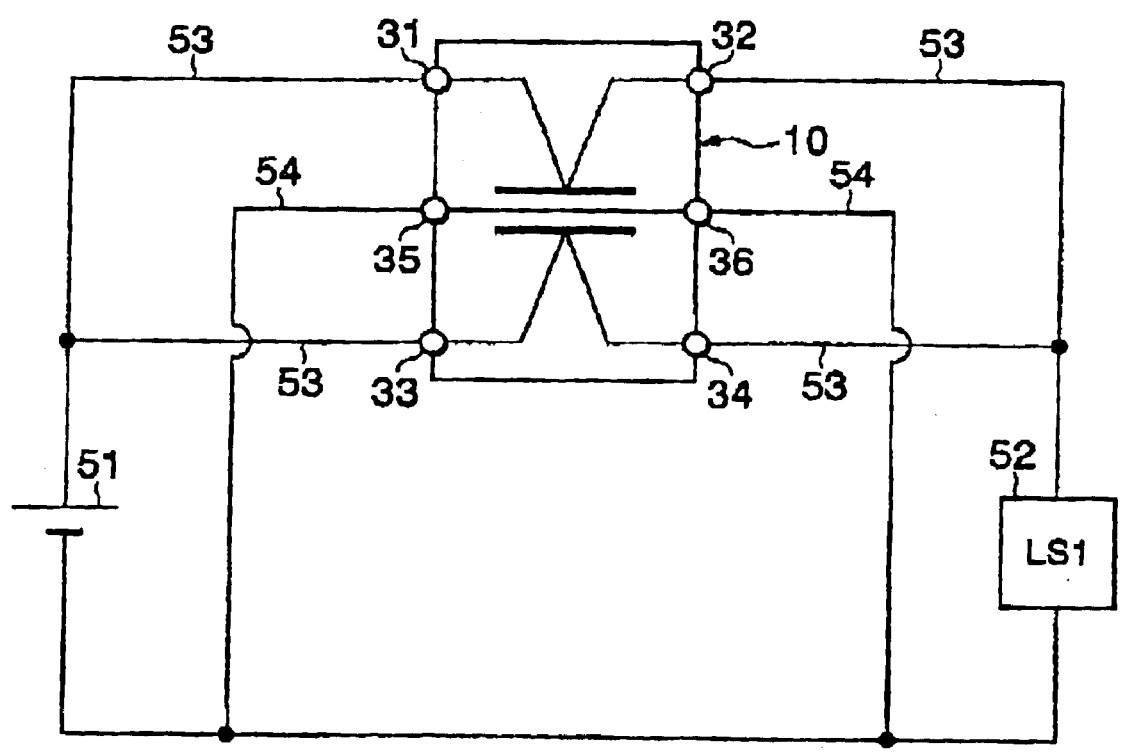
FIG. 10 is a circuit diagram of a first example of use of a multilayer feedthrough capacitor according to the first embodiment.

FIG. 10 shows one example of the case of use of the multilayer feedthrough capacitor 10 according to the first embodiment as a decoupling capacitor between a power source 51 and an LSI 52. The terminal electrodes 31 to 36 of the capacitor 10 have a first row of interconnects 53, 54 connected to them.

Figure 11:
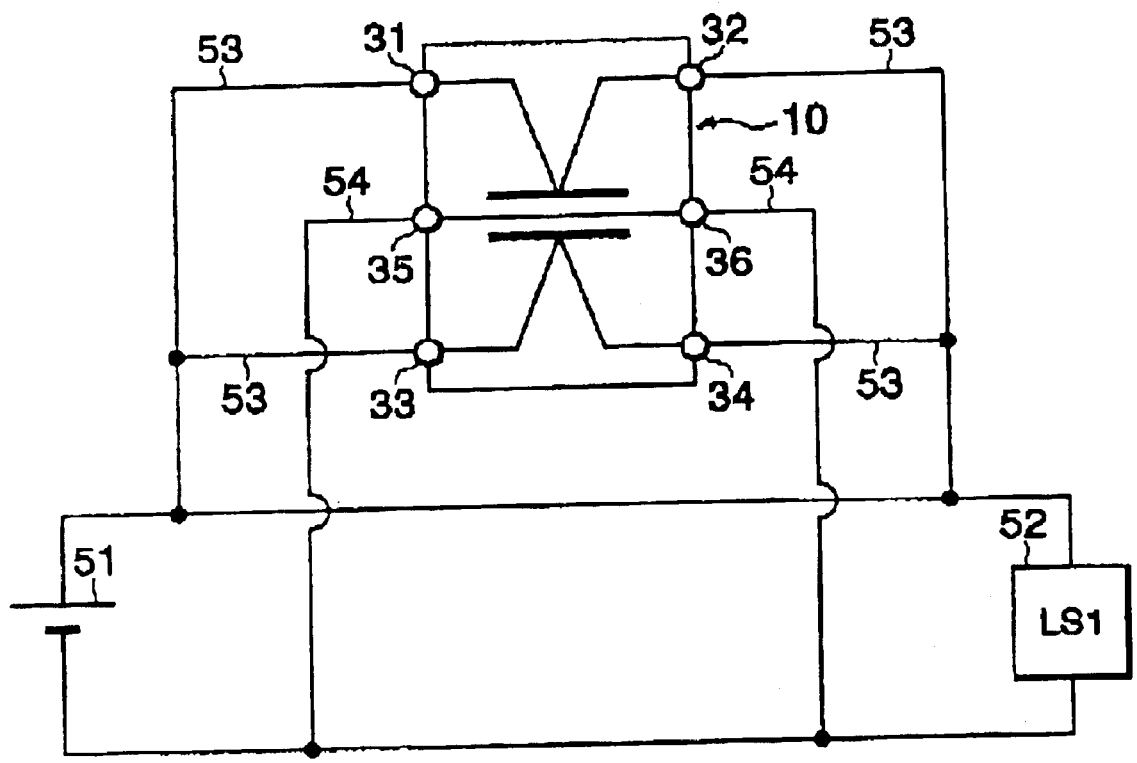
FIG. 11 is a circuit diagram of a second example of use of a multilayer feedthrough capacitor according to the first embodiment.

FIG. 11 shows another example of the case of use of the multilayer feedthrough capacitor 10 according to the first embodiment as a decoupling capacitor between a power source 51 and LSI 52, The terminal electrodes 31 to 36 of the capacitor 10 have a second row of interconnects 53, 54 connected to them.

That is, the capacitors according to the embodiments of the present invention can be used not only for high frequency signals, but also as power sources. In such examples, two sets of input/output terminal electrodes 31 to 34 are connected by interconnects 53 to the plus side of the power source 51 and one end of the LSI 52, and a pair of ground use terminal electrodes 35, 36 are connected by the interconnects 54 to the minus side of the power source 51 and the other end of the LSI 52.

In the example shown in FIG. 10, however, the plus side of the power source 51 and the one end of the LSI 52 are connected through the multilayer feedthrough capacitor 10 at all paths. As opposed to this, in the example shown in FIG. 1, the plus side of the power source 51 and the one end of the LSI 52 are directly connected in some paths.

As explained above, according to the present invention, both the noise of the common mode and the noise of the differential mode can be eliminated and also the ESL can be further reduced to improve the effect of elimination of high frequency noise.

While the invention has been described with reference to specific embodiments chosen for purpose of illustration, it should be apparent that numerous modifications could be made thereto by those skilled in the art without departing from the basic concept and scope of the invention.

For example, the multilayer feedthrough capacitors 10 according to the above embodiments have seven internal conductors and six terminal electrodes, but the number of layers, that is, the number of internal conductors, and the number of terminal electrodes are not limited to these. Further greater numbers are also possible.

What is claimed is:

1. A multilayer feedthrough capacitor comprising:
   a first internal conductor arranged in a dielectric body,
   an intermediate internal conductor arranged in said dielectric body and stacked with said first internal conductor via a ceramic layer.
   a second internal conductor arranged in said dielectric body and stacked with said intermediate internal conductor via a ceramic layer,
   a first terminal electrode formed at an outside surface of said dielectric body and connected to said first internal conductor.
   a second terminal electrode formed at the outside surface of said dielectric body and connected to said second internal conductor, and
   an intermediate terminal electrode formed at the outside surface of said dielectric body and connected to said intermediate internal conductor, characterized in that said second internal conductor is formed with a pair of branch parts led out toward two opposite outside surfaces of said dielectric body, and each of the branch parts is connected to each of a pair of second terminal electrodes.

2. The multilayer feedthrough capacitor as set forth in claim 1, characterized in that:
   said second internal conductor has a rectangular pattern slightly narrower than said ceramic layer forming said dielectric body, and
   said pair of branch parts are formed at one end of said rectangular pattern in the longitudinal direction thereof.

3. A multilayer feedthrough capacitor comprising:
   a first internal conductor arranged in a dielectric body.
   an intermediate internal conductor arranged in said dielectric body and stacked with said first internal conductor via a ceramic layer.
   a second internal conductor arranged in said dielectric body and stacked with said intermediate internal conductor via a ceramic layer.
   a first terminal electrode formed at an outside surface of said dielectric body and connected to said first internal conductor,
   a second terminal electrode formed at the outside surface of said dielectric body and connected to said second internal conductor, and
   an intermediate terminal electrode formed at the outside surface of said dielectric body and connected to said intermediate internal conductor, characterized in that said intermediate internal conductor is formed with a pair of branch parts led out toward two opposite outside surfaces of said dielectric body, and each of the branch parts is connected to each of a pair of intermediate terminal electrodes.

4. The multilayer feedthrough capacitor as set forth in claim 3, characterized in that:
   said intermediate internal conductor has a rectangular pattern slightly narrower than said ceramic layer forming said dielectric body, and
   said pair of branch parts are formed at a substantial center of said rectangular pattern in the longitudinal direction thereof.

5. The multilayer feedthrough capacitor as set forth in claim 3, characterized in that:
   said intermediate internal conductor is further formed with, separate from the pair of branch parts led out toward the two opposite outside surfaces of said dielectric body, a pair of branch parts led out to another two opposite outside surfaces separate from said two outside surfaces, each of these branch parts is connected to each of said intermediate terminal electrodes, and
   the four said outside surfaces of said dielectric body are formed with intermediate terminal electrodes.

6. A multilayer feedthrough capacitor comprising:
   a first internal conductor arranged in a dielectric body.
   an intermediate internal conductor arranged in said dielectric body and stacked with said first internal conductor via a ceramic layer.
   a second internal conductor arranged in said dielectric body and stacked with said intermediate internal conductor via a ceramic layer.
   a first terminal electrode formed at an outside surface of said dielectric body and connected to said first internal conductor.
   a second terminal electrode formed at the outside surface of said dielectric body and connected to said second internal conductor, and
   an intermediate terminal electrode formed at the outside surface of said dielectric body and connected to said intermediate internal conductor, characterized in that said intermediate terminal electrode is connected to the ground, while said first terminal electrode and said second terminal electrode are connected to paths for transmission of signals.

7. A multilayer feedthrough capacitor comprising:
   a first internal conductor arranged in a dielectric body,
   an intermediate internal conductor arranged in said dielectric body and stacked with said first internal conductor via a ceramic layer,
   a second internal conductor arranged in said dielectric body and stacked with said intermediate internal conductor via a ceramic layer,
   a first terminal electrode formed at an outside surface of said dielectric body and connected to said first internal conductor,
   a second terminal electrode formed at the outside surface of said dielectric body and connected to said second internal conductor,
   an intermediate terminal electrode formed at the outside surface of said dielectric body and connected to said intermediate internal conductor, an auxiliary second internal conductor arranged insulated from said first internal conductor on the same plane inside said dielectric body and connected to said second internal conductor via said second terminal electrode, and an auxiliary first internal conductor arranged insulated from said second internal conductor on the same plane inside said dielectric body and connected to said first internal conductor via said first terminal electrode.

8. The multilayer feedthrough capacitor as set forth in claim 7, characterized in that said first internal conductor and said second internal conductor have currents passing through them in opposite directions, and said auxiliary first internal conductor and said auxiliary second internal conductor have currents passing through them in opposite directions.

9. The multilayer feedthrough capacitor as set forth in claim 7, characterized in that, inside said dielectric body, said intermediate internal conductor is stacked between said first internal conductor and second internal conductor via said ceramic layers.

10. The multilayer feedthrough capacitor as set forth in claim 7, characterized in that said first internal conductor and auxiliary first internal conductor are respectively formed with pairs of branch parts led out toward two opposite outside surfaces of said dielectric body, and each of the branch parts is connected to each of a pair of first terminal electrodes.

11. The multilayer feedthrough capacitor as set forth in claim 10, characterized in that:

said first internal conductor and auxiliary first internal conductor respectively have rectangular patterns slightly narrower than half of the area of said ceramic layer forming said dielectric body, and said pairs of branch parts are formed at one ends of said rectangular patterns in the longitudinal direction thereof.

12. The multilayer feedthrough capacitor as set forth in claim 7, characterized in that said second internal conductor and auxiliary second internal conductor are respectively formed with pairs of branch parts led out toward two opposite outside surfaces of said dielectric body, and each of the branch parts is connected to a pair of second terminal electrodes.

13. The multilayer feedthrough capacitor as set forth in claim 12, characterized in that:

said second internal conductor has a rectangular pattern slightly narrower than half of the area of said ceramic layer forming said dielectric body, and said pair of branch parts are formed at one end of said rectangular pattern in the longitudinal direction thereof.

14. The multilayer feedthrough capacitor as set forth in claim 7, characterized in that said intermediate internal conductor is formed with a pair of branch parts led out toward two opposite outside surfaces of said dielectric body, and each of the branch parts is connected to a pair of intermediate terminal electrodes.

15. The multilayer feedthrough capacitor as set forth in claim 14, characterized in that:

said intermediate internal conductor has a rectangular pattern slightly narrower than said ceramic layer forming said dielectric body, and said pair of branch parts are formed at a substantial center of said rectangular pattern in the longitudinal direction thereof.

16. The multilayer feedthrough capacitor as set forth in claim 14, characterized in that:

said intermediate internal conductor is further formed with, separate from the pair of branch parts led out toward the two opposite outside surfaces of said dielectric body, a pair of branch parts led out to another two opposite outside surfaces separate from said two outside surfaces, each of these branch parts is connected to each of said intermediate terminal electrodes, and the four said outside surfaces of said dielectric body are formed with intermediate terminal electrodes.

17. The multilayer feedthrough capacitor as set forth in claim 7, characterized in that said intermediate terminal electrode is formed at the outside surface of said dielectric body between said first terminal electrode and said second terminal electrode.

18. The multilayer feedthrough capacitor as set forth in claim 7, characterized in that said intermediate terminal electrode is connected to the ground, while said first terminal electrode and said second terminal electrode are connected to paths for transmission of signals.

* * * * *